United States Patent
Chang

(10) Patent No.: US 8,317,415 B2
(45) Date of Patent: Nov. 27, 2012

(54) MOUNTING APPARATUS

(75) Inventor: Yu-Lang Chang, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 49 days.

(21) Appl. No.: 13/150,290

(22) Filed: Jun. 1, 2011

(65) Prior Publication Data

US 2012/0104206 A1    May 3, 2012

(30) Foreign Application Priority Data

Oct. 28, 2010    (TW) ............................... 99136958 A

(51) Int. Cl.
   *G03B 17/00*    (2006.01)
(52) U.S. Cl. ........................................................ 396/428
(58) Field of Classification Search .................. 396/428; 348/373, 375, 376
   See application file for complete search history.

(56) References Cited

U.S. PATENT DOCUMENTS

| | | | | |
|---|---|---|---|---|
| 5,903,706 | A * | 5/1999 | Wakabayashi et al. | 386/224 |
| 7,019,784 | B1 * | 3/2006 | Shibuya et al. | 348/373 |
| 7,432,977 | B2 * | 10/2008 | Chiang | 348/373 |
| 7,764,320 | B1 * | 7/2010 | Salvato | 348/344 |
| 7,891,889 | B2 * | 2/2011 | Zhang | 396/428 |
| 2004/0212728 | A1 * | 10/2004 | Tsai | 348/376 |
| 2012/0104206 | A1 * | 5/2012 | Chang | 248/291.1 |

* cited by examiner

*Primary Examiner* — W. B. Perkey
(74) *Attorney, Agent, or Firm* — Altis Law Group, Inc.

(57) ABSTRACT

A mounting apparatus comprises a shell, a positioning member, a rotating member, and a connecting member. The positioning member is secured to the shell; the connecting member is adapted to secure a camera module. The rotating member is secured to the connecting member, and extends out off the shell. The positioning member includes a first flange and a second flange, the connecting member is rotatable and secured between the first flange and the second flange, and the connecting member is rotatable between a first position by the rotating member, where the connecting member abuts the first flange, and a second position, where the connecting member abuts the second flange.

20 Claims, 4 Drawing Sheets

MOUNTING APPARATUS

BACKGROUND

1. Technical Field

The present disclosure relates to a mounting apparatus, and particularly to a mounting apparatus used in an electronic product.

2. Description of Related Art

Some electronic devices, such as a mobile phone, notebooks and e-books, are usually equipped with a camera. The lens of many of these cameras are fixed or secured on the backside or on the top frame of the display screen of the electronic device. Thus, when using the electronic device it may not be possible or at least very inconvenient to adjust the viewing angle of the camera.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
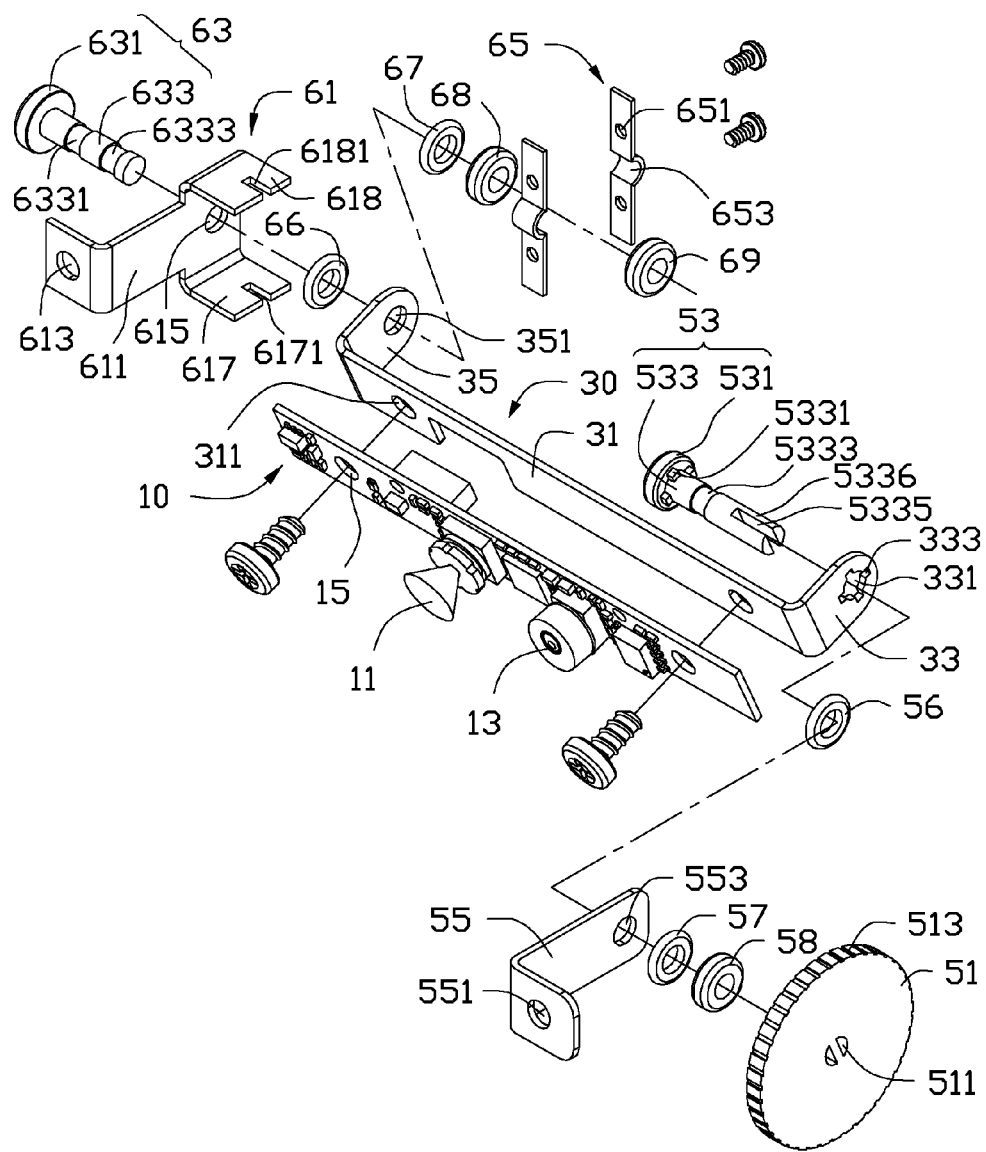
FIG. 1 is an exploded, isometric view of a mounting apparatus in accordance with an embodiment.

Referring to FIG. 1, a mounting apparatus in accordance with an embodiment is used for securing a camera module 10, and includes a connecting member 30.

The camera module 10 includes a microphone 11 and a camera 13. The camera module 10 defines a first positioning hole 15 in each of two opposite ends.

The connecting member 30 includes a main body 31, a first connecting wall 33 and a second connecting wall 35. The first connecting wall 33 extends from one end of the main body 31, and the second connecting wall 35 extends from an opposite end of the main body 31. The first and second connecting walls 33, 35 are in a first direction. The main body 31 defines two second positioning holes 311 corresponding to the two first positioning holes 15. The first connecting wall 33 defines a first opening 331 and a plurality of first limiting holes 333 around the first opening 331. The first opening 331 communicates with the first limiting holes 333. The second connecting wall 35 defines a second opening 351. In one embodiment, the first connecting wall 33 and the second connecting wall 35 are substantially perpendicular to the main body 31. The camera module 10 is secured to the main body 31 with two locking members, such as screws, being inserted into the two first positioning holes 15 and the two corresponding second positioning holes 311.

A rotating member 51 defines two second limiting holes 511, and a plurality of teeth 513 is located on an outer surface of the rotating member 51 to increase friction. A shaft 53 includes a first body 531 and a second body 533 located on the first body 531. A plurality of mounting tabs 5331 is located on the second body 533. The mounting tabs 5331 correspond to the first limiting holes 333. The second body 533 defines a first slot 5333 and a first notch 5335. An end of the second body 533 is divided into two mounting portions 5336 corresponding to the two second limiting holes 511 of the rotating member 51 by the first notch 5335. A first positioning member 55 defines a first mounting hole 551 and a second mounting hole 553. In one embodiment, the first mounting hole 551 and the second mounting hole 553 are round, and the diameter of the second mounting hole 553 is larger than that of the second body 533.

In assembly of the first positioning member 55, the second body 533 of the shaft 53 is inserted through the first opening 331, the mounting tabs 5331 are engaged in the first limiting holes 333. The shaft 53 is secured to the first connecting wall 33. A first washer 56, the first positioning member 55, a second washer 57 and a third washer 58 are engaged with the second body 533 in turn. The first washer 56 abuts the first connecting wall 33 and the first positioning member 55. The third washer 58 is engaged in the first slot 5333. The first positioning member 55 is secured between the first washer 56 and the second washer 57. The shaft 53 is capable of rotating relative to the first positioning member 55. The mounting portions 5336 are engaged in the corresponding second limiting holes 511. The rotating member 51 is secured to the second body 533 of the shaft 53.

A second positioning member 61 includes a positioning wall 611. The positioning wall 611 defines a third mounting hole 613 and a fourth mounting hole 615. A first flange 617 extends from a side edge of the positioning wall 61, and a second flange 618 extends from an opposite side edge of the positioning wall 611. The first flange 617 defines a second notch 6171, and the second flange 618 defines a third notch 6181. A positioning shaft 63 includes a third body 631 and a fourth body 633 located on the third body 631. The fourth body 633 defines a second slot 6331 and a third slot 6333. Each positioning piece 65 defines two third positioning holes 651. A bulge 653 extends from each of the positioning pieces 65 between the two positioning holes 651. In one embodiment, the bulge 653 has a semicircle cross section.

In assembly of the positioning shaft 63, the fourth body 633 is located between the first flange 617 and the second flange 618 through the third mounting hole 615. The fourth body 633 is inserted in turn into a first positioning ring 66, the second opening 351, a second positioning ring 67, and a third positioning ring 68. The first positioning ring 66 abuts the second positioning member 61, and the third positioning ring 68 is engaged in the second slot 6331. The second positioning member 61 is located between the third body 631 and the first positioning ring 66. The second connecting wall 35 is rotatably secured between the first positioning ring 66 and the second positioning ring 67. The two positioning pieces 65 sandwiches the fourth body 633. The fourth body 633 is located between the bulge 653 of the two positioning pieces 65. The two positioning pieces 65 are engaged in the second notch 6171 and the third notch 6181 and secured together by two fasteners, such as screws. A fourth positioning ring 69 is engaged in the third slot 6333. The two positioning pieces are secured between the third positioning ring 68 and the fourth positioning ring 69. The connecting member 30 is capable of rotating relative to the positioning shaft 63.

Figure 4:
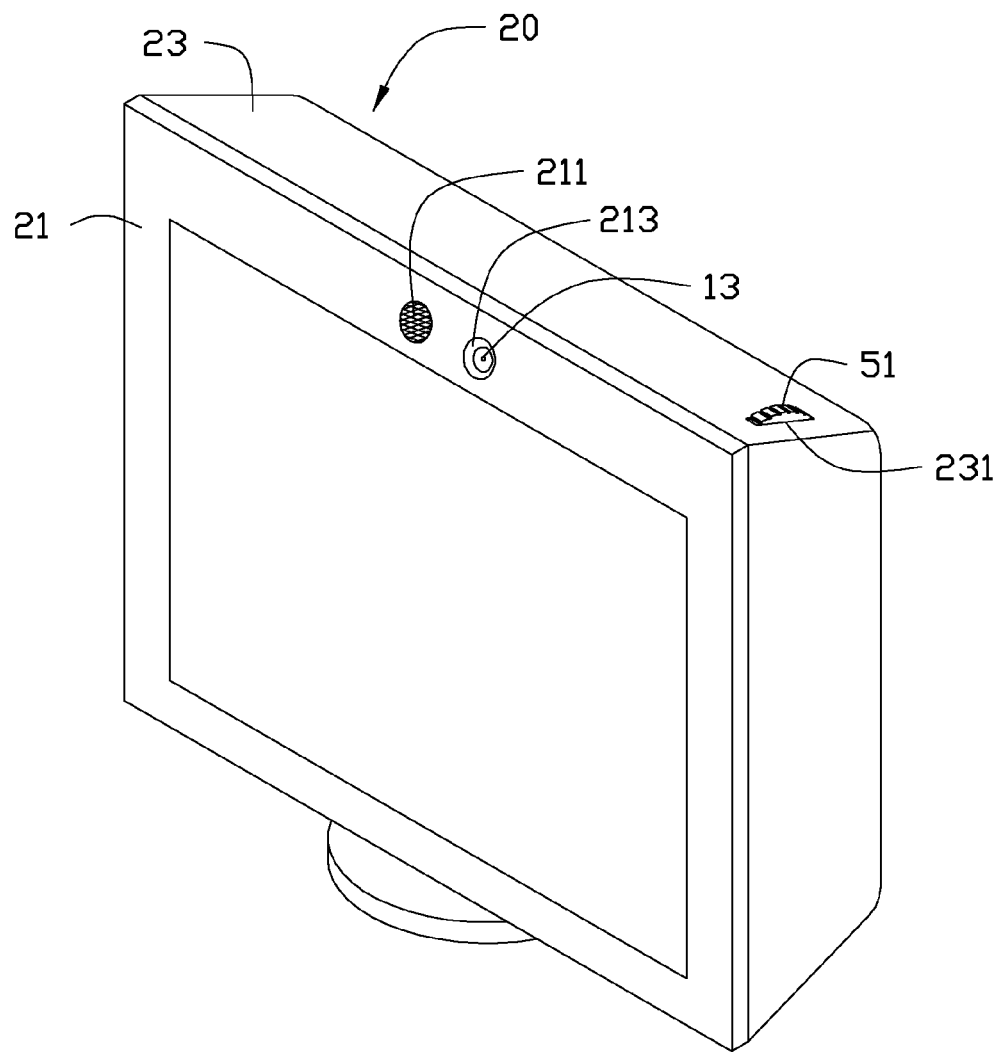
FIG. 4 is an assembled, isometric view of the mounting apparatus of FIG. 2 and a shell.

Referring to FIG. 4, the camera module 10 is secured to a shell 20. The shell 20 includes a front plate 21 and a cover plate 23. The front plate 21 defines a mesh 211 and a first through hole 213. The cover plate 23 defines a second through hole 231. The first positioning member 55 and the second positioning member 61 are secured to the inner face of the front plate 21. The microphone 11 corresponds to the mesh 211, and the camera 13 corresponds to the first through hole 213. The rotating member 51 extends out of the shell 20 through the second through hole 231, for adjusting the viewing angle of the camera module 10. In one embodiment, the shell 20 may be a monitor shell.

Figure 2:
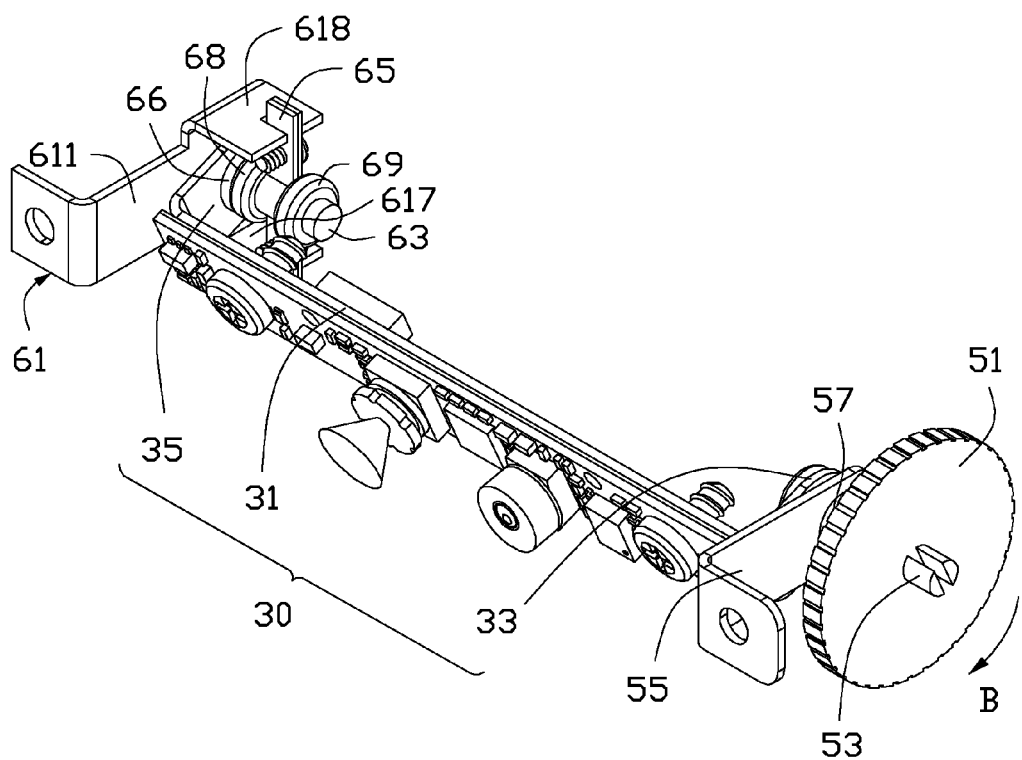
FIG. 2 is an assembled, isometric view of FIG. 1.
Figure 3:
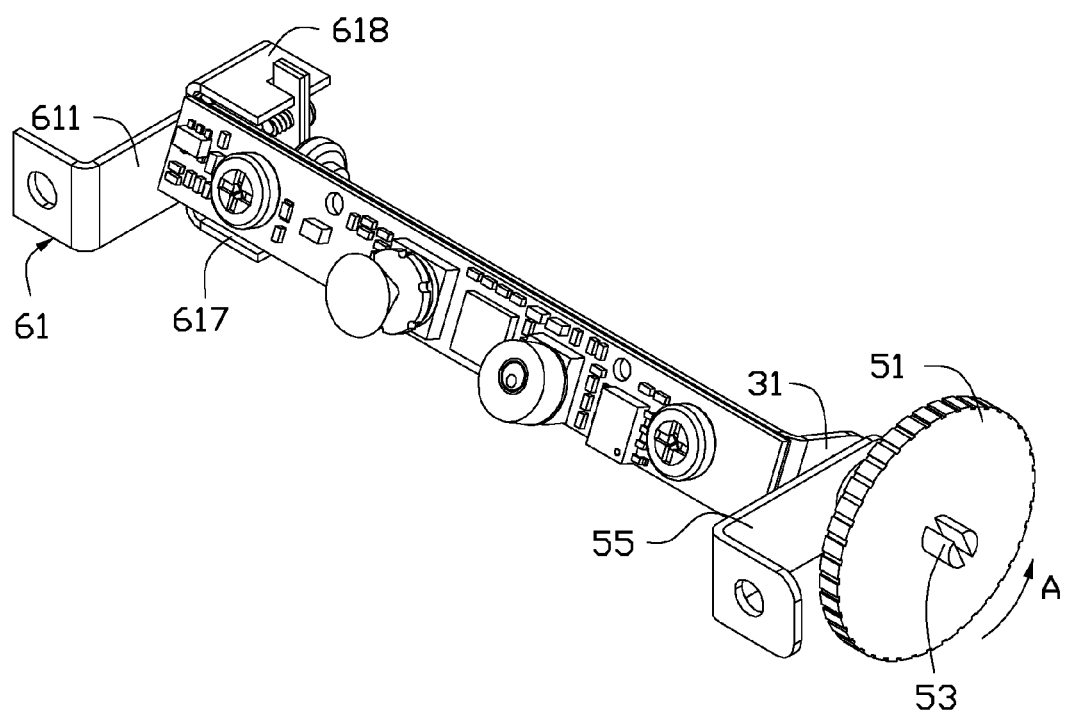
FIG. 3 is similar to FIG. 2, but showing a camera module in a different position.

Referring to FIG. 2-3, the camera module 10 is capable of rotating between a first position and a second position. When the camera module 10 is in the first position, the second connecting wall 35 abuts the first flange 617, and the camera module 10 is inclined relative to the second positioning member 61. When the camera module 10 is in the second position, the second connecting wall 35 abuts the second flange 618. A direction that the camera module 10 inclines in the first position is opposite to that which the camera module 10 inclines in the second position. When the camera module 10 is rotated from the first position to the second position, the rotating member 51 is rotated along a first direction "A", to drive the shaft 53 to rotate along the first direction "A". Because the first connecting wall 33 is engaged with the shaft 53, the connecting member 30 is rotated along the first direction "A". Until the second flange 618 blocks the connecting member 30, the camera module 10 is located in the second position. Contrarily, the rotating member 51 is rotated along a second direction "B", to drive the shaft 53 to rotate along the second direction "B", the connecting member 30 is rotated along the second direction "B follow the shaft 53. Until the first flange 617 blocks the connecting member 30, the camera module 10 is rotated from the second position to the first position.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a shell;
a positioning member secured to the shell;
a connecting member adapted to secure a camera module;
a rotating member secured to the connecting member and extending out of the shell;
wherein the connecting member is rotatable and secured to the positioning member, and the rotating member is rotatable with the connecting member relative to the positioning member.

2. The mounting apparatus of claim 1, wherein the positioning member comprises a first flange and second flange, and the connecting member is located between the first flange and the second flange.

3. The mounting apparatus of claim 2, wherein the connecting member is rotatable between a first position, where the connecting member abuts the first flange, and a second position, where the connecting member abuts the second flange.

4. The mounting apparatus of claim 2, wherein the connecting member comprises a main body, a first connecting wall, and a second connecting wall; the main body is adapted to secure the camera module; the first connecting wall and the second connecting wall extend from the main body and are substantially perpendicular to the main body.

5. The mounting apparatus of claim 4, wherein the second connecting wall is located between the first flange and the second flange.

6. The mounting apparatus of claim 4, further comprising two positioning pieces and a positioning shaft rotatably secures the positioning member to the second connecting wall.

7. The mounting apparatus of claim 6, wherein each of the two positioning pieces comprises a bulge, and the positioning shaft is secured between the bulges of the two positioning pieces.

8. The mounting apparatus of claim 6, wherein the first flange defines a first notch, the second flange defines a second notch, and the two positioning pieces are engaged in the first notch and the second notch.

9. The mounting apparatus of claim 4, further comprising a rotating shaft secured to the rotating member and the first connecting wall.

10. The mounting apparatus of claim 9, wherein the first connecting wall defines a positioning hole, and the rotating shaft includes a mounting tab engaged in the positioning hole.

11. A mounting apparatus comprising:
a shell;
a positioning member secured to the shell;
a connecting member adapted to secured a camera module;
wherein the positioning member includes a first flange and a second flange, the connecting member is rotatable and secured between the first flange and the second flange, and the connecting member is rotatable between a first position, where the connecting member abuts the first flange, and a second position, where the connecting member abuts the second flange.

12. The mounting apparatus of claim 11, wherein a rotating member is secured to the connecting member and rotatable with the connecting member.

13. The mounting apparatus of claim 12, wherein the rotating member extends out of the shell.

14. The mounting apparatus of claim 11, the connecting member comprises a main body, a first connecting wall, and a second connecting wall; the main body is adapted to secure the camera module; the first connecting wall and the second connecting wall extend from the main body; and are substantially perpendicular to the main body.

15. The mounting apparatus of claim 14, wherein the second connecting wall is located between the first flange and the second flange.

16. The mounting apparatus of claim 14, further comprising two positioning pieces and a positioning shaft rotatably secures the positioning member to the second connecting wall.

17. The mounting apparatus of claim 16, wherein each of the two positioning pieces comprises a bulge, and the positioning shaft is secured between the bulges of the two positioning pieces.

18. The mounting apparatus of claim 16, wherein the first flange defines a first notch, the second flange defines a second notch, and the two positioning pieces are engaged in the first notch and the second notch.

19. The mounting apparatus of claim 14, further comprising a rotating shaft secured to the rotating member and the first connecting wall.

20. The mounting apparatus of claim 19, wherein the first connecting wall defines a positioning hole, and the rotating shaft includes a mounting tab engaged in the positioning hole.

* * * * *